June 30, 1953          H. H. PAULSEN          2,643,478

FISHING LINE AGITATOR

Filed July 21, 1952          2 Sheets-Sheet 2

INVENTOR
HERMAN H. PAULSEN,

BY *Babcock & Babcock*

ATTORNEYS

Patented June 30, 1953

2,643,478

UNITED STATES PATENT OFFICE 2,643,478

FISHING LINE AGITATOR

Herman H. Paulsen, Flandreau, S. Dak.

Application July 21, 1952, Serial No. 300,065

8 Claims. (Cl. 43—19.2)

This invention relates to a fishing line agitating device for causing the hook with the bait on it or near it to move, preferably with a jerking motion, to attract the attention of the fish, whereby the would be fisher may dump on the agitating device all of the "dirty work" of fishing until a fish actually grabs the bait, at which time the so-called sportsman or fisher would be expected to take over and do his bit by reeling in or otherwise pulling in the line and landing the fish and removing it from the hook, after which the line may be turned back to the chaperonage of the agitator until another poor fish takes the bait, when the above routine will be repeated.

The primary object of the invention is to provide automatic means for releasably holding a fishing line and giving it a jerking upward movement and then permitting it to drop back into the water by its own weight, this movement or cycle being constantly repeated until a fish takes the bait and pulls the line free from the agitator. Other objects are: to provide a pivoted catch for hooking under an agitator lever with means for ensuring that the same is properly positioned at the bottom of its stroke so as to certainly engage the lever and raise it with a jerking movement when the retractor slide moves upward; to provide means for moving the hook or other means out of engagement with said lever to permit the same to move or swing downward entirely independent of said retractor slide; to provide means, preferably spring means, for moving said agitator slide upward with sudden jerking movement; to provide cushioning means, such as a compression spring, for the lever as it drops and swings downward about its hinge or fulcrum point after it has been released by the catch; to provide a yielding clutch for safeguarding the mechanism against damage in case the impeller blade should be rotated the wrong way by the wind or for other reason the drive shaft should be driven in the wrong direction and to improve and simplify the various details of the device.

The device of the present invention is primarily intended for the winter sport of fishing through the ice and for this reason it will preferably be provided with suitable supporting legs normally resting on the ice for supporting the working parts in proper position with relation to a fishing hole through the ice. However, the device is not limited to use under such conditions, but may be used wherever and under whatever conditions it may be found that it will function and its use is desired.

Figure 1:
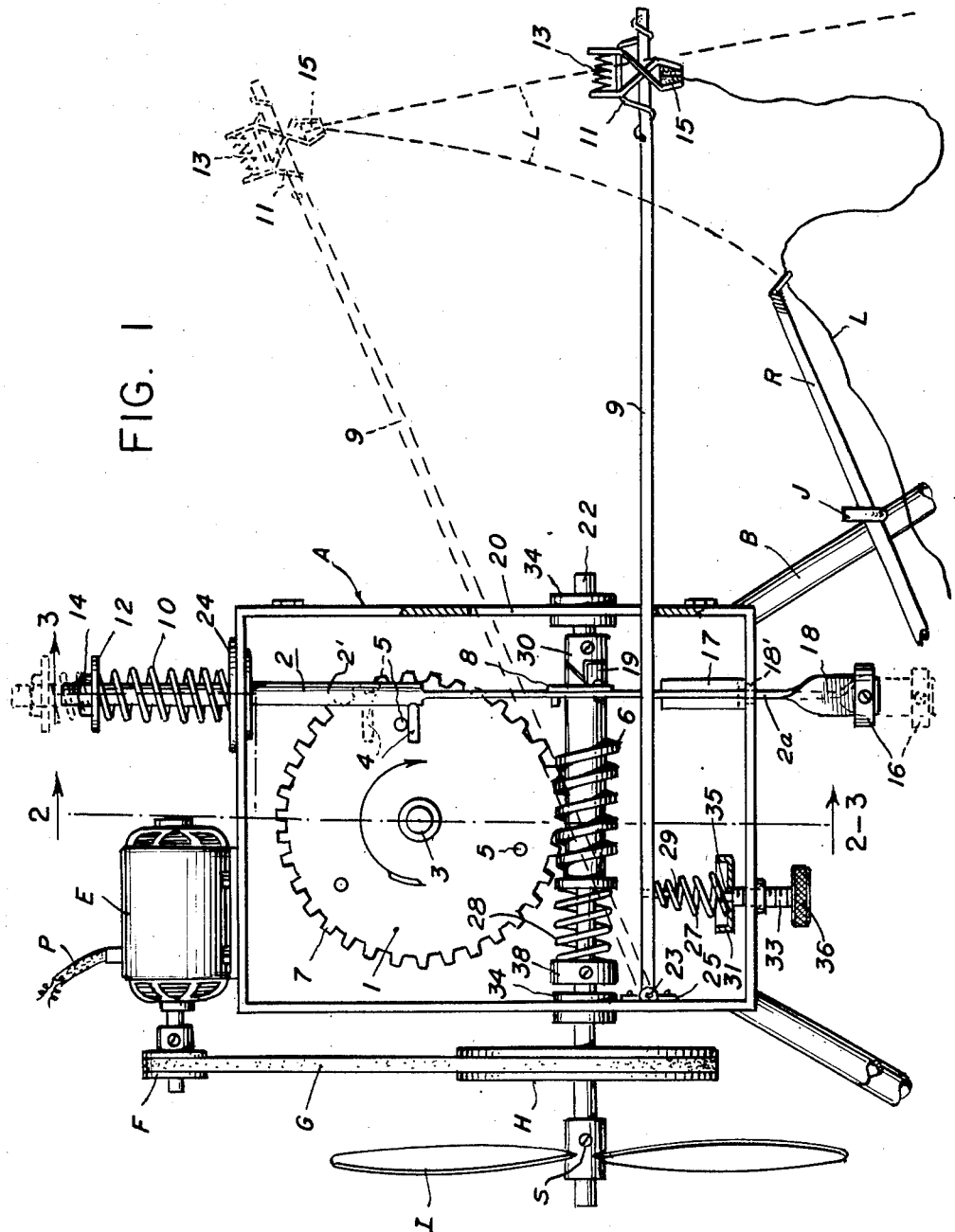
Figure 2:
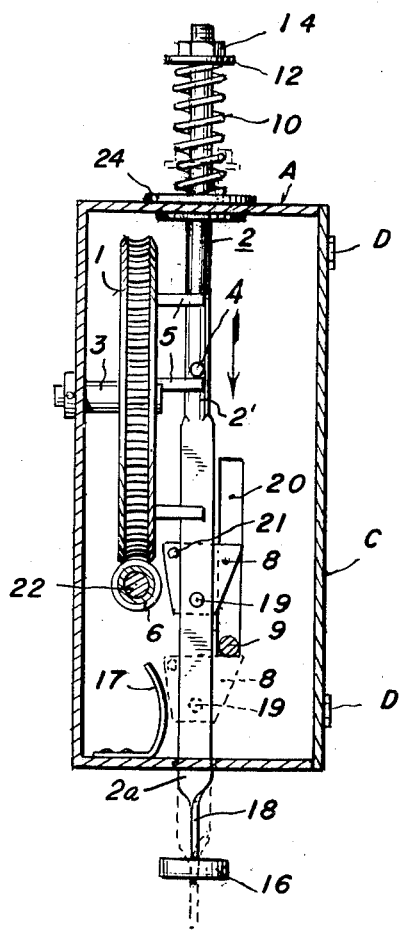

In the accompanying drawings:

Figure 1 represents a side elevation of an agitating device or apparatus embodying my invention, the side or door C being swung on its hinges D to open position:

Figure 2, a sectional view on the line 2—2 of Fig. 1, looking in the direction of the arrow and with the agitator lever 9 in or substantially in its extreme low position and with the catch 8 shown in an intermediate position in solid lines and in extreme low position hooked under lever 9 in dotted lines; the gear I being shown in edge elevation.

Figure 3:
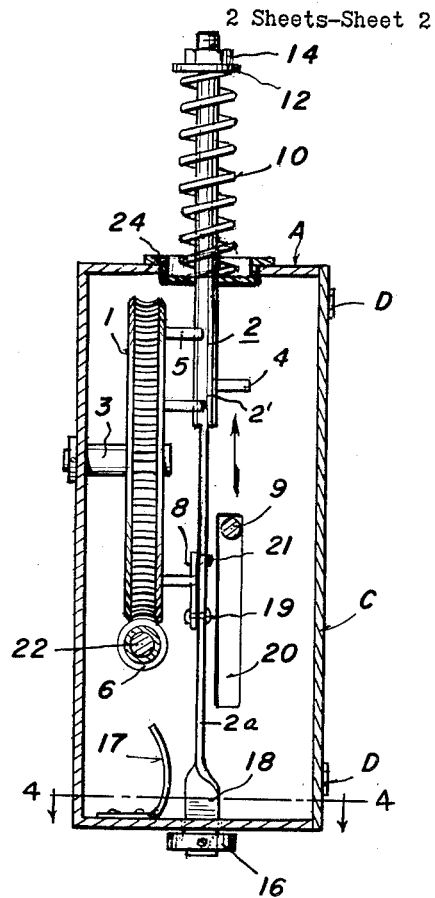
Figure 4:
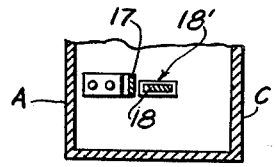

Figure 3, a view similar to Fig. 2 and looking in the same direction and showing the agitator slide rotated through 90 degrees to get the catch 8 out of the way of the agitator lever 9 so that the latter may move from its extreme upper position, in which it is shown, to its extreme lower position shown in Fig. 2, under the influence of gravity and the pull of tension spring 27; and Figure 4, a fragmentary detail sectional view on the line 4—4 of Figure 2, looking in the direction of the arrows.

Referring now in detail to the drawings, A designates a casing supported by three or more legs or a suitable supporting base or structure B and having a movable side or door C mounted and movable on hinges D for permitting access to the interior of the casing A, a conventional electric motor E being suitably mounted, preferably on the upper face of said casing A, and provided with a drive pulley F driving a drive belt G passing around drive pulley F and driven pulley H mounted on rotary shaft 22 to turn therewith, said motor E being connected by power wires P to a suitable source of electrical energy or power.

I designates an impeller of two blade type secured in any usual manner to the shaft 22, as by a set screw, to cause said shaft 22 to turn with said impeller I as the latter is rotated by the wind or air rushing by it.

L designates the usual fishing line which may be threaded through the usual eyes or line guides of the more elaborate fishing rods such as R and may be wound upon or about a conventional fishing line reel, not shown, so that once the fish has taken the bait and the line L been released by the line clamp or grip II, the fishing rod R may be grasped and removed from the supporting prong, hook or bracket J and from then on until the fish is landed the fisher or sportsman takes over and reels in the fish in the usual manner, or in case he uses just a line and rod without a reel, or just a line, he pulls the fish up through the opening in the ice and removes him from the hook preparatory to repeating the operation to catch another fish.

The parts above referred to as designated by letters are old and have heretofore been used to serve the function for which they are employed in the present case, or if not the exact same function, then a function quite analogous thereto.

1 designates a main gear wheel mounted for rotation about the axis of shaft 3 suitably supported by the casing A, said main gear 1 having peripheral teeth 7 engaged and driven by the worm 6 and being provided with a plurality, preferably three, equidistantly spaced actuator or depressor pins or rods 5 to engage upon the upper surface of a pin or finger or rod 4 extending at right angles from the face of, and rigid with, the agitator slide 2 parallel to the side face of the main gear 1 or substantially so and substantially at right angles to the actuator or depressor pins or rods 5 which are carried by said main gear 1 and extend from said gear 1 substantially at right angles to the side face thereof.

The agitator slide 2 has a relatively heavy substantially cylindrical in cross section upper portion 2' and a lighter thin strip metal blade portion 2a preferably of very heavy sheet steel having its lower end portion working through a narrow elongated slot 18' of such size and disposition as to just snugly slidably receive the cross-sectional area of said lower blade portion 2a, the extreme lower portion 18 of which is twisted into a plane substantially at right angles to the rest of said lower blade portion 2a to cooperate with the walls of said slot 18' to cause the agitator slide 2 to move through a partial rotation of 90 degrees as the agitator slide 2 moves for a fleeting instant into its extreme upper position under the influence of compression spring 10 to move the finger 4 out of the path of, and parallel with, the depressor rods 5 and the catch 8 out from under the lever 9 and substantially parallel to the side of the main gear 1 to permit the lever 9 to drop by gravity, swinging about its hinge or fulcrum or pintle 23 carried by a plate 25 suitably secured in any conventional manner to the inner side of the casing A so as to extend through an elongated slot 20 in the opposing side of the casing A and well out beyond the latter side of the casing A preferably for a distance preferably well in excess of the width of the box or casing A so as to give a substantial arc of movement to the extreme outer end portion of the lever 9 which carries the clamp 11 having its jaws pressed together by a compression spring 13. The jaws of said clamp 11 will preferably be lined or formed with insert blocks or pads or cushions 15 of yielding plastic of some nature, preferably rubber, relatively soft rubber, so as to clamp and hold between them the fishing line L until such time as a fish takes the bait and pulls on the line, pulling it from between the blocks or pads or cushions 15 of said clamp.

The catch 8 is pivotally mounted on the agitator slide 2 by means of a pin or rivet 19 and has a stop pin 21 which contacts the rear edge of the agitator slide 2 when the catch 8 is in its full operative or extended position wherein it substantially spans the slot 20 in the side of the casing or case A.

In operation, the lever 9 having fallen or swung down to its extreme lowest point due to its own weight and the weight of the bait and appurtenances on the submerged part of line L, and its fall having been cushioned by the compression spring 27, as the agitator slide 2 approaches the end of its downward movement under the thrust of the depressor rod or pin 5 at the time in engagement with the finger 4, the beveled front edge of the catch 8 will engage the lever 9 and such engagement will cause the catch 8 to rock rearwardly on its pivot 19 until it passes said lever 9, whereupon the rear edge of said catch 8 will progressively engage the resetting spring or lug 17 as the agitator slide 2 continues to move downward until the stop pin 21 is again in contact with, or approximately in contact with, the rear edge of the lower portion 2a of the agitator slide 2 and the upper edge of the catch 8 lies beneath the rod 9 and substantially spans the slot 20, which point of travel of the slide 2 corresponds to the disengagement of the finger 4 by the pin 5 as the latter moves clockwise with the main gear 1 around the axis of the fulcrum or stub-shaft 3.

As the finger 4 is disengaged by the pin or rod 5 the agitator slide 2 will be forced upward with a sudden jerk or movement by the spring 10 which will have been compressed between the upper face of the drop center cup or washer 24 and the opposed face of the head or washer 12 held in engagement with the upper end of the spring 10 by a nut 14 screwed on the threaded upper end portion 2' of the slide 2. Such sudden jerking movement of the slide 2 will jerk the lever 9 upward, suddenly swinging it about its hinge pintle or fulcrum 23. As the slide 2 moves into the last stages of its upward movement the twisted portion 18 will pass through the mentioned slot 18' in the bottom of the casing, causing the slide 2 to make a partial rotation of approximately 90 degrees on its axis and swinging the finger 4 out of the path of travel of the depressor rods or pins 5 and at the same instant swinging catch 8 from beneath, and out of the path of travel of, lever 9, thus releasing lever 9 and permitting it to fall by gravity to its initial and lowest position, the fall of lever 9 being cushioned by the compensating compression or cushioning spring 27.

The weight of the agitator slide 2 and connected parts as a whole is such in relation to the strength of the compression spring 10 that the weight of the slide 2 will cause it to move downward from its extreme uppermost point to such extent that its lower twisted portion 18 will have passed completely below the bottom of the casing A and in so doing will have caused the slide 2 to make a reverse partial rotation of approximately 90 degrees back to its original position, wherein its finger 4 will again lie in the path of travel of the rods or pins 5 and the catch 8 will be disposed transversely of the lever 9 and will substantially span the slot 20 and move below, engage, and raise the lever 9.

A stop collar or clamp 16 may be secured by a set screw or in other conventional manner to the lower end portion of the slide 2 to definitely limit the upward movement of said slide 2.

The compensating compression cushioning spring 27 is adjustable in strength or degree of compression so that it may also serve to compensate for differences in the weights of that portion of the line L and appurtenances, such as bait and possibly weights, submerged or pendent in the water.

Preferably the spring 27 will be a helical spring in the form of a frustro-cone with its wide base received in a cup 31 which is supported by the square upper face or annular shoulder of adjusting screw 33 and is formed with a central opening to removably receive the vertical pin preferably integral with and extending from and concentric with the axis of said screw 33 above the annular shoulder thereof to center the cup 31. The reduced upper end of the helical spring 27 receives the long pin 29 secured in a socket in the lever 9 and depending therefrom preferably through several helices of the spring 27, the compression of which between the lever 9 and the cup 31 serves to maintain it in proper position and operative relation.

The adjusting screw 33 engages in the threads of an internally screw-threaded perforation or bore through the bottom of the casing A, which will preferably be reinforced or thickened at this point by an added thickness or sheet of metal welded to the lower face of said bottom, and the screw 33 may have a knurled knob 36 to facilitate turning it to adjust the compression of the spring 27 as desired to compensate for the variations in weight as mentioned.

The drive shaft 22 is mounted in suitable bearings 34 pressed into the front and back of the casing A or otherwise suitably mounted and secured therein. A clutch collar 30 is secured to the shaft 22 in any suitable manner, as by a set screw, to turn therewith and is located closely adjacent to, but spaced slightly from, the front bearing 34. A stock collar 38 is similarly secured to the shaft 22 closely adjacent to, but slightly spaced from, the front face of the rear bearing 34.

Interposed between the clutch collar 30 and the stop collar 38 and disposed about the shaft 22 are the worm 6 and helical release spring 28, the worm 6 being adjacent to the collar 30 and in driving engagement with the gear teeth 7 of main gear 1 and having its forward end formed with a clutch face to cooperate with said clutch collar 30 whereby the latter will engage and drive the worm 6 when the shaft 22 is rotated in a clockwise direction and will be released and move axially toward the rear bearing 34 against the resistance of spring 28 and so be free from engagement and rotary drive by the clutch collar 30 should the shaft 22 be rotated in a counter-clockwise direction, the release spring 28 being interposed between the rear end face of worm 6 and the front end face of stop collar 38. Thus, the agitating device or mechanism will be protected against possible damage should the shaft 22 be rotated in a counter-clockwise direction.

The pulley H is secured to the shaft 22 to turn therewith in any conventional and suitable manner, as for instance, by a set screw not shown.

The impeller I is to be secured to the shaft 22 to turn therewith in any conventional suitable manner, as for instance, by set screws.

Both the pulley H and the impeller I are to be rotated in a clockwise direction to rotate the worm 6 in a clockwise direction and to be the latter drive the main gear 1 in a clockwise direction.

Should the pulley H or impeller I be rotated in the reverse, or counterclockwise, direction the worm 6 would not be rotated but would move endwise against the opposition of release spring 28, so preventing possible damage to the agitating device or mechanism.

The cupped washer 24 just sits in an opening in the top of the casing A with a loose fit. The external diameter of the cupped portion of the washer 24 exceeds the greatest transverse dimensions of the catch 8, and the combined thickness of the upper part of agitator slide 2 and the length of finger 4, so that the assembled unit of the agitator slide 2 with its finger 4 and its catch 8 mounted thereon may be inserted or removed as a unit through the opening in the top of the casing, it being necessary only to remove the stop 16 from the lower end portion of slide 2 prior to removing the same, or to apply stop 16 to the lower end portion of slide 2 after inserting the same.

Of course the motor E with its power line P and drive pulley F drive belt G and driven pulley H may be eliminated or omitted and reliance placed entirely on wind power to drive the impeller I, or conversely the impeller I may be omitted and reliance placed entirely on the motor E and associated elements and the availability of a source of electrical power.

I claim:

1. A fishing line agitator comprising a casing, a gear, depressor pins rigid with and rotating with said gear, a pair of bearings in said casing, a shaft mounted in said bearings, a clutch collar secured to said shaft to rotate therewith, a stop collar fixed to said shaft against axial displacement, a drive worm rotatable about the axis of said shaft and in driving engagement with said gear and having an end face engaged and driven by said clutch collar, a release spring disposed between the other end of said worm and said stop collar and exerting pressure on said worm to force it toward said clutch collar, and means for rotating said shaft, said casing having an opening in the top, a slot in one side and a second slot in the bottom thereof in combination with a vertically reciprocable slide, a removable member disposed in the first mentioned opening in and supported by the top of said casing, an agitator compression spring disposed about said slide and confined between the upper portion thereof and said member, a lever pivotally connected to one side of said casing and extending through the first mentioned slot in the opposite side thereof, a pair of jaws carried by said lever to releasably grip a fishing line between them, a finger extending rigidly at right angles from said slide and normally lying in the path of travel of and engaged by one of said depressor pins, a catch pivotally mounted on said slide to engage under said lever and having a stop engaging said slide to limit the forward pivotal movement thereof, said slide having its upper portion slidably and partially rotatably supported by said member and its lower portion of thin elongated form in cross-section and snugly slidably received in said second slot in said casing, the lower portion of said slide having a twist substantially at right angles to the rest of said slide to cause the slide with its catch as it moves to its extreme raised position to make a partial rotation about its axis to such degree as to swing said catch out of the path of travel of the lever to release the latter and permit it to drop by gravity to its lowest position.

2. A fishing line agitator comprising a casing, a gear, depressor pins rigid with and rotating with said gear, a pair of bearings in said casing, a shaft mounted in said bearings, a clutch collar secured to said shaft to turn therewith, a stop collar mounted on said shaft against axial displacement, a drive worm rotatable about the axis of said shaft in driving engagement with said gear, a release spring disposed about said shaft between one end of said worm and said stop collar and exerting pressure on said worm to force it toward said clutch collar, the other end of said worm and said clutch collar being formed with cooperating clutch faces to drive the worm in a clockwise direction, and means for rotating said shaft, said casing having an opening in the top, a slot in one side and a second slot in the bottom thereof, in combination with a removable member in said opening in and supported by the top of said casing, an agitator compression spring disposed about said slide and confined between the upper portion thereof and said member, a lever pivotally connected to one side of said casing and extending through the first mentioned slot in the opposite side thereof, a pair of jaws carried by said lever to releasably grip a fishing line between them, a finger extending at right angles from said slide and normally lying in the path of travel of and engaged by one of said depressor pins, a catch pivotally mounted on said slide to engage under said lever and having a stop engaging said slide to limit the forward pivotal movement thereof, said slide having its lower portion of elongated form in cross-section and snugly slidably received in said second slot in said casing, a portion of said slide having a twist substantially at right angles to the next adjacent portion to cooperate with the walls of the last mentioned slot to give said slide a partial rotation about its axis.

3. A fishing line agitator comprising a casing having a slot in the bottom thereof, a gear, pins rigid with and rotating with said gear, a drive worm in driving engagement with said gear, and means for rotating said worm, in combination with a vertically reciprocable slide, an agitator compression spring disposed about said slide and confined between the upper portion thereof and the top of said casing, a lever movably connected to said casing, a pair of jaws carried by said lever to releasably grip a fishing line between them, a finger extending at right angles from said agitator slide and normally lying in the path of travel of and adapted to be engaged by one of said depressor pins, a bearing in the top of said casing, a catch pivotally mounted on said agitator slide to engage under said lever and having a stop engaging said slide to limit the forward pivotal movement thereof, and resilient resetting means mounted on the upper face of the bottom of the casing adjacent said slide for engaging with said catch to swing said catch about its pivot under and in engagement with said lever, said slide having its upper portion slidably and partially rotatably disposed in said bearing and its lower portion of thin elongated form in cross-section and snugly slidably received in said slot in said casing the lower portion of said slide having a twist substantially at right angles to the rest of said slide to cause said slide with its catch as it moves to its extreme raised position to make a partial rotation about its axis to such a degree as to swing said catch out of the path of travel of the lever to release said lever and permit it to drop by gravity to its lowest position, the weight of said slide and the strength of said agitator spring being so related that the weight of said agitator slide will cause it to move downward against the opposition of said agitator spring to such degree that the twisted portion of the slide will have moved downward through the slot in said casing and will have reversely partially rotated said slide sufficiently to swing the finger into the path of travel of the depressor pins and to swing the catch into position to move down and catch under said lever.

4. A fishing line agitator comprising a casing having a slot through the bottom thereof, a vertically reciprocable slide, means for forcing said slide downward to a point of release, means for forcing said slide upwardly with an abrupt fast motion, a lever pivotally mounted in said casing and extending beyond the face thereof, and a pair of jaws carried by said lever to releasably grip a fishing line between them, in combination with a catch pivotally mounted on said slide to engage under said lever and having a stop engaging said slide to limit its forward pivotal movement, a bearing in the top of said casing, and resilient resetting means mounted at a fixed point in said casing adjacent said slide for engaging said catch during the continued downward movement of the latter after the same has moved downward with said slide and swung about its pivot to clear said lever, said resetting means serving to swing said catch back about its pivot to swing under and into engagement with said lever, said slide having its upper portion slidably and partially rotatably disposed in said bearing and its lower portion of thin elongated form in cross-section and snugly slidably received in said slot, the lower portion of said slide having a twist substantially at right angles to the rest of said slide to cause the slide with its catch as it moves to its extreme raised position to make a partial rotation about its axis to such a degree as to swing said catch out of the path of travel of the lever to release said lever and permit it to drop by gravity to its lowest position, the weight of said slide being such that said slide will drop downward by its own weight to such extent that the twisted portion of the slide will have moved downward through said slot and reversely partially rotated the slide sufficiently to swing the catch into position to move down and catch under said lever.

5. A fishing line agitator comprising a casing having a slot in the bottom thereof, power means, a vertically reciprocable slide forced downward to a point of release by said power means, spring means loaded by said power means for kicking said slide upward with an abrupt sudden motion when the point of release is reached, a lever pivotally mounted in said casing and extending through and beyond the casing, a bearing in the top of said casing, and a pair of jaws carried by said lever to releasably grip a fishing line between them, in combination with a catch pivotally mounted on said slide to engage under said lever and a stop on said catch engaging said slide to limit its forward pivotal movement, said slide having its upper portion slidably and partially rotatably disposed in said bearing and having its lower portion of thin elongated form in cross-section and snugly slidably received in said slot in said casing, the lower portion of said slide having a twist substantially at right angles to the rest of said slide to cause the slide with its catch as it moves to its extreme raised position to make a partial rotation about its axis to such a degree as to swing said catch out of the path of travel of the lever to release said lever and permit it to drop to its lowest position, the weight of said slide being such that said slide will move downward to such extent that the twisted portion of the slide will have moved downward through said slot and will have partially reversely rotated the slide sufficiently to swing the catch into position to move down and catch under said lever.

6. A fishing line agitator comprising a casing, a reciprocable slide in said casing, a power means for forcing said slide in one direction to a point of release from said power means, spring means loaded by said power means for kicking said slide in the reverse direction with an abrupt sudden movement when the point of release is reached, a lever pivotally mounted in said casing and extending out beyond a face of said casing, and a pair of jaws carried by said lever to releasably grip a fishing line between them, in combination with a catch pivotally mounted on said slide to engage said lever and a stop on said slide engaging said slide to limit the pivotal movement of said catch in one direction during the reciprocatory movement of said slide.

7. A fishing line agitator comprising a casing, a constantly driven gear in said casing, rotating means for normally driving said gear constantly in one direction and permitting drive in a reverse direction, means for releasing said gear from said drive means on the reverse rotation of said drive means, in combination with a vertically reciprocable slide, a compression spring disposed about said slide and confined between the upper portion thereof and the top of said casing, a lever pivotally connected to said casing, a pair of jaws carried by said lever to releasably grip an element between them, a catch pivotally mounted on said slide to engage under said lever and having a stop engaging said slide to limit the forward pivotal movement of said catch, and cooperating means carried by said gear and slide for forcing said slide in one direction to a point of release of said slide against the opposition of said compression spring.

8. A fishing line agitator comprising a casing, a constantly driven gear in said casing, a vertically reciprocating slide in said casing, cooperating means on said gear and slide for intermittently forcing said slide down and releasing it, and means for rotating said gear, in combination with a compression spring disposed about said slide between the upper portion thereof and the top of said casing, a lever pivotally mounted in said casing, a pair of jaws carried by said lever to releasably grip an element between them, and a catch pivotally mounted on said slide to engage under said lever and having a stop engaging said slide to limit the forward pivotal movement of said catch.

HERMAN H. PAULSEN.

No references cited.